United States Patent
Voigt et al.

(10) Patent No.: US 11,858,746 B2
(45) Date of Patent: Jan. 2, 2024

(54) METHOD AND APPARATUS FOR MONITORING SPROCKET WEAR, E.G. IN A MINING CONVEYOR

(71) Applicant: Caterpillar Inc., Peoria, IL (US)

(72) Inventors: Robert Voigt, Bochum (DE); Jarrod Brooks, Blacks Beach (DE)

(73) Assignee: Caterpillar Inc., Peoria, IL (US)

( * ) Notice: Subject to any disclaimer, the term of this patent is extended or adjusted under 35 U.S.C. 154(b) by 342 days.

(21) Appl. No.: 17/423,404

(22) PCT Filed: Jan. 14, 2020

(86) PCT No.: PCT/EP2020/025014
§ 371 (c)(1),
(2) Date: Jul. 15, 2021

(87) PCT Pub. No.: WO2020/148092
PCT Pub. Date: Jul. 23, 2020

(65) Prior Publication Data
US 2022/0063923 A1 Mar. 3, 2022

(30) Foreign Application Priority Data
Jan. 15, 2019 (GB) .................................... 1900573

(51) Int. Cl.
*B65G 23/06* (2006.01)
*F16H 57/01* (2012.01)

(52) U.S. Cl.
CPC ............. *B65G 23/06* (2013.01); *F16H 57/01* (2013.01); *F16H 2057/012* (2013.01)

(58) Field of Classification Search
CPC ... B65G 23/06; F16H 57/01; F16H 2057/012; F16H 7/06; F16H 55/30; F16H 55/303
See application file for complete search history.

(56) References Cited

U.S. PATENT DOCUMENTS 4,487,088 A * 12/1984 Olson .................... F16H 55/30
74/462
5,348,515 A 9/1994 Miller
(Continued)

FOREIGN PATENT DOCUMENTS

| CN | 105115391 B | 12/2017 |
| CN | 108917516 A | 11/2018 |

(Continued)

OTHER PUBLICATIONS

International Search Report for related International Application No. PCT/EP2020/025014; dated Mar. 11, 2020.
(Continued)

*Primary Examiner* — Mark A Deuble

(57) ABSTRACT

A sprocket comprising teeth for engaging one or more chains is provided with datum connection portions which releasably support a datum body, such as a tensioned wire, in a predefined position. The datum body provides a temporary reference or datum element or surface from which the position of the wear surfaces of the sprocket teeth may be determined by eye or by measurement, particularly in the radial direction. The teeth may further comprise a set of markings corresponding to angularly spaced reference planes intersecting at the sprocket axis. The markings are preferably arranged on the crown or radially outward surface of the teeth and are used to determine wear in the circumferential direction.

10 Claims, 7 Drawing Sheets

(56) References Cited

U.S. PATENT DOCUMENTS

| | | | |
|---|---|---|---|
| 7,018,313 B2 | 3/2006 | Nakamura | |
| 7,442,139 B2 | 10/2008 | Kubo et al. | |
| 7,604,113 B2 * | 10/2009 | Pluszynski | B65G 23/06 |
| | | | 474/96 |
| 7,997,402 B2 * | 8/2011 | Merten | B65G 19/20 |
| | | | 198/728 |
| 8,038,558 B2 * | 10/2011 | Klabisch | B65G 19/20 |
| | | | 474/155 |
| 2005/0170924 A1 * | 8/2005 | Meya | F16H 55/30 |
| | | | 474/155 |
| 2011/0138951 A1 | 6/2011 | Mashue et al. | |
| 2017/0241536 A1 | 8/2017 | Lintunen | |
| 2017/0284914 A1 | 10/2017 | Johnson | |

FOREIGN PATENT DOCUMENTS

| | | |
|---|---|---|
| JP | 5923453 B2 | 4/2016 |
| KR | 200444183 YA | 4/2009 |

OTHER PUBLICATIONS

Great Britain Search Report related to GB Application No. GB1900573. 5; dated Jul. 1, 2019.

\* cited by examiner

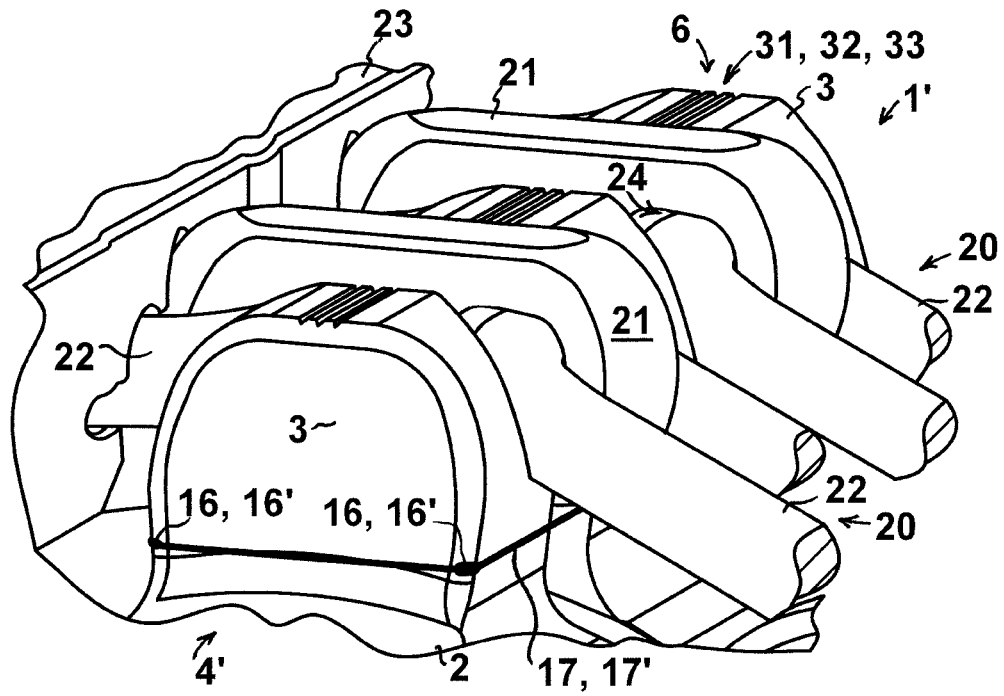
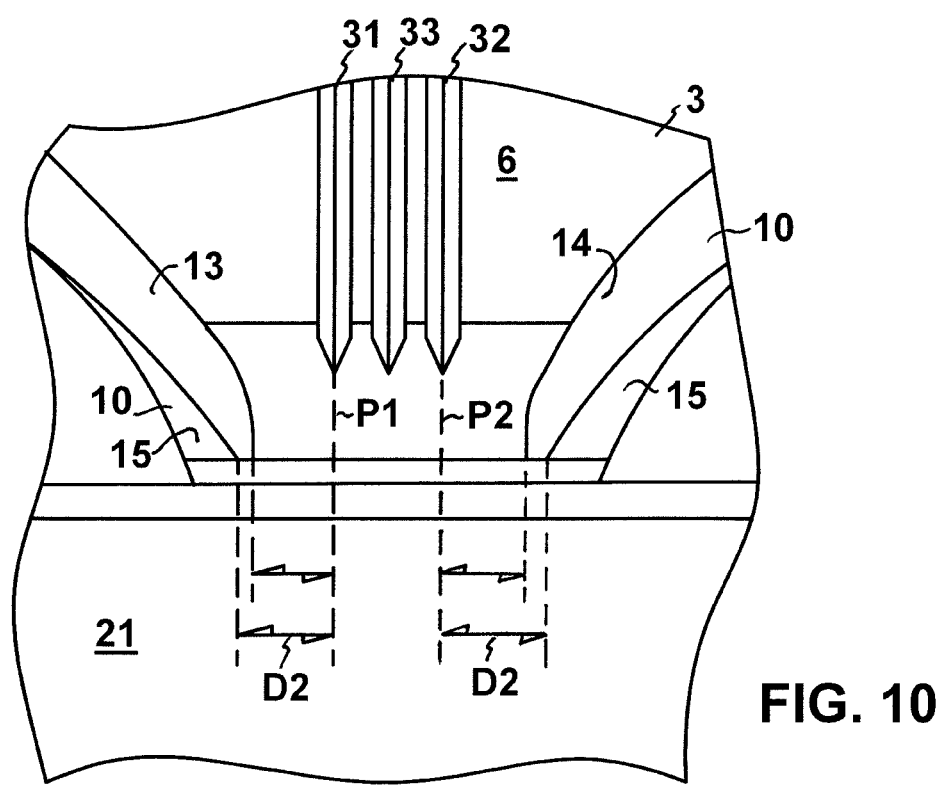

METHOD AND APPARATUS FOR MONITORING SPROCKET WEAR, E.G. IN A MINING CONVEYOR

CROSS-REFERENCE TO RELATED APPLICATION

This Application is a 35 USC § 371 US National Stage filing of International Application No. PCT/EP2020/025014 filed on Jan. 14, 2020 which claims priority under the Paris Convention to Great Britain Patent Application No. 1900573.5 filed on Jan. 15, 2019.

TECHNICAL FIELD

This disclosure relates to arrangements for monitoring wear in the teeth of a sprocket, particularly (although not exclusively) in a sprocket having multiple sets of teeth for engaging the links of two or more chains arranged in parallel, such as a drive sprocket of a face conveyor or collecting conveyor as used in underground longwall mining.

BACKGROUND

It is known for example from U.S. Pat. Nos. 7,018,313 B2 and 5,348,515 to provide a marker such as a raised or recessed line on the side surface (axial end face) of a sprocket to provide a reference point for determining the degree of wear of the teeth in the radial or circumferential direction.

JP 59 23453 B2 teaches a measuring jig to be inserted between adjacent teeth of a drive sprocket. The position of the jig is compared with markers on the side surfaces of the sprocket to determine the degree of wear of the teeth.

Such methods are generally intended for use with roller chains and the like, wherein the teeth of the sprocket extend through apertures in the links. They are less suitable for monitoring wear in sprockets as used in mining conveyors wherein the teeth do not extend through apertures in the links, being configured instead to engage the outwardly facing surfaces of alternate links of the chain, wherein the links comprise interlinked rings. Such chains are capable of withstanding the large tension forces and heavy abrasion encountered in conveyors and other applications in underground mining, but the configuration of the sprocket makes it difficult to monitor wear since the wear surfaces of the teeth are concealed by the axially outward portion of the tooth when viewed from the end of the sprocket. It is particularly difficult to observe or measure the wear profile of the teeth when the sprocket is configured with multiple rows of teeth to drive two or more chains in parallel.

In such sprockets it is desirable to measure wear of the teeth in both radial and circumferential directions with respect to the sprocket axis. The radial measurement determines the depth of the pocket that receives the horizontal link of the chain, and conventionally is carried out using a depth gauge with the chain in place. The gauge is inserted centrally through the horizontal link to measure the radial distance between the radially outward surface of the link and the body of the sprocket in-between the teeth. The measurement can only be performed when the chain is in place.

In order to perform the measurement, the surface of the sprocket lying radially inwardly beneath the centre of the horizontal chain link must be cleaned carefully to provide a reference surface for the measuring tool. This can be difficult to achieve since the target area is covered by the chain and may be obscured by debris trapped between the chain and the sprocket.

The measurement must be repeated for each tooth in the row along the axial length of the sprocket.

The circumferential (tooth thickness) measurement can also be difficult in practice because the links of the chain obscure the wear surfaces.

Another difficulty with existing measurement procedures is that the permissible wear envelope for the circumferential (tooth thickness) dimension dictates, not only a lower limit for the overall thickness of the tooth, but also an upper limit for the erosion of each of the leading and trailing end surfaces of the tooth relative to the original geometry of the sprocket. Since it can be difficult to determine the angular position about the sprocket axis of the original centre line of the worn tooth, it is also difficult to determine the relative degree of wear of the leading and trailing end surfaces. Thus, disproportionate wear on the leading surface relative to the trailing surface may move the tooth profile outside the permitted tolerance, while the overall tooth thickness dimension appears to be acceptable.

SUMMARY

In a first aspect, the present disclosure provides a sprocket for use with at least one chain. The sprocket includes a body mounted for rotation about an axis, and a plurality of teeth projecting radially outwardly from the body with respect to the axis.

The teeth include wear surfaces configured to engage respective links of the at least one chain, wherein in use the wear surfaces are progressively worn by contact with the chain to define a varying wear profile of the teeth.

The sprocket further includes at least two datum connection portions spaced apart axially along the sprocket and not forming part of the wear surfaces.

The datum connection portions are configured to releasably engage a datum body extending between the datum connection portions to support the datum body in a predefined position relative to the sprocket and proximate a respective one or ones of the wear surfaces, said predefined position being independent of the wear profile.

In another aspect, the disclosure provides a method for monitoring wear in the novel sprocket After arranging the datum connection portions as described above, a datum body is releasably engaged with the datum connection portions to extend axially along the sprocket between the datum connection portions.

The datum body is supported by the datum connection portions in a predefined position relative to the sprocket and proximate a respective one or ones of the wear surfaces, said predefined position being independent of the wear profile.

The distance between the wear surfaces and the datum body is then determined before disengaging the datum body from the datum connection portions.

The datum body may comprise a wire which is arranged in tension between the datum connection portions.

The teeth may include side surfaces extending radially and circumferentially and facing generally in an axial direction with respect to the axis, end surfaces extending radially and axially and facing generally in a circumferential direction with respect to the axis, and edges bounding the teeth at intersections of respective ones of the side surfaces and end surfaces, wherein each of the datum connection portions is configured as a recess in a respective one of the edges.

In order to monitor wear in the circumferential direction, at least one of the teeth may be provided with at least first and second markings, the markings being provided on a visible surface of the respective tooth, the visible surface not forming part of the wear surfaces.

The first and second markings are arranged in respective, first and second reference planes which extend radially and axially with respect to the axis and are spaced apart angularly about the axis between the respective, leading and trailing end surfaces of the respective tooth in an unworn condition of the sprocket.

The first and second reference planes indicate maximum wear limits for the leading and trailing end surfaces which form part of the wear surfaces, extending radially and axially and facing generally in opposite circumferential directions with respect to the axis.

The distance between at least one of the leading and trailing end surfaces and at least one of the reference planes may be determined by reference to at least one of the markings in a worn condition of the sprocket.

BRIEF DESCRIPTION OF THE DRAWINGS

Further features and advantages will become apparent from the following illustrative embodiments which will now be described, purely by way of example and without limitation to the scope of the claims, and with reference to the accompanying drawings, in which:

FIG. 9 shows the first row of teeth of the second sprocket with a datum body comprising a tensioned wire engaged in the recesses; and FIG. 10 is an enlarged view of the crown of one of the teeth of FIG. 8, showing how the distance between the leading and trailing end surfaces and the reference planes is measured by reference to the markings.

Reference numerals and characters appearing in more than one of the figures indicate the same or corresponding parts in each of them.

DETAILED DESCRIPTION

Figure 1:
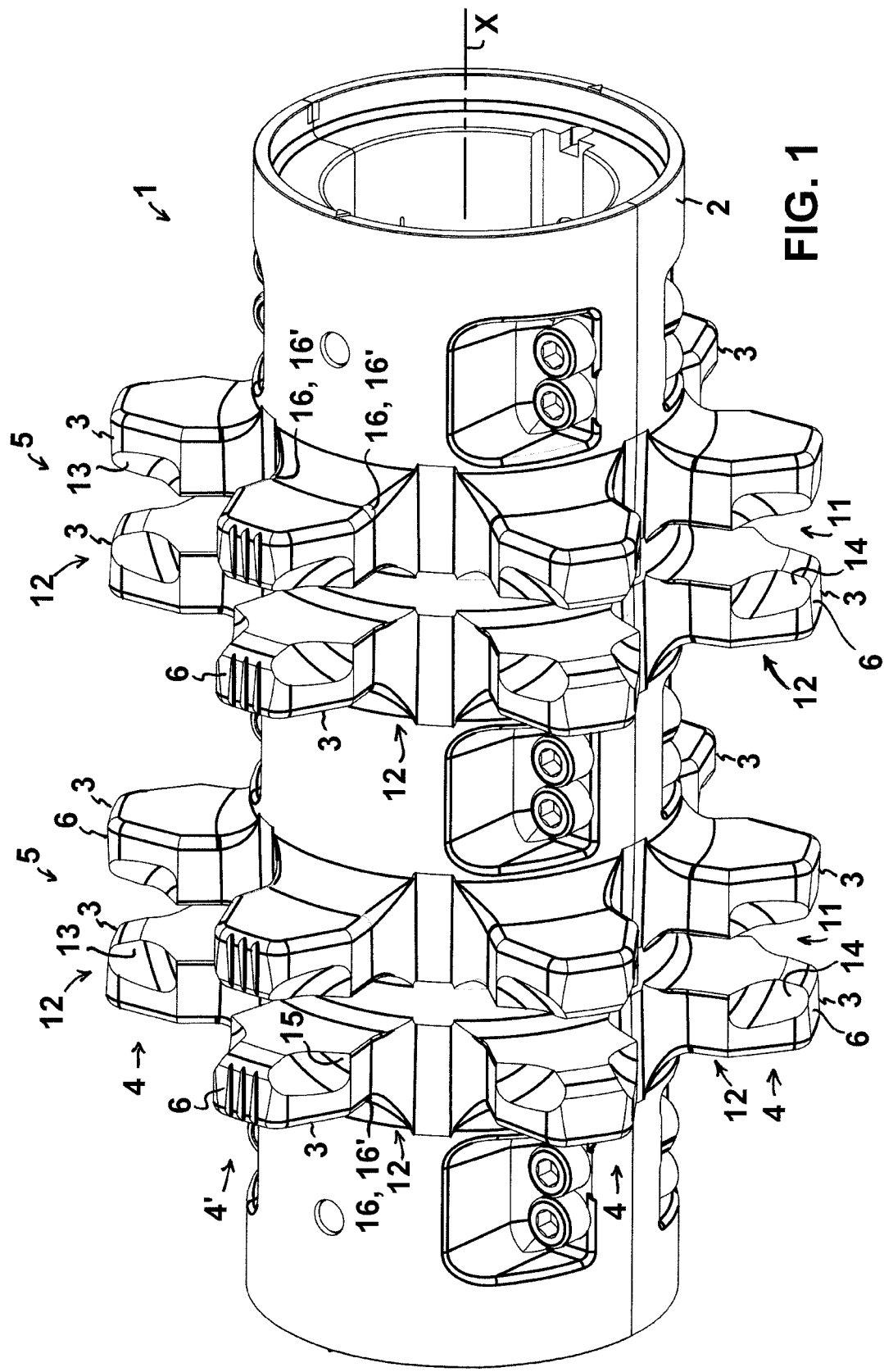
FIG. 1 shows a first sprocket comprising six rows of teeth configured to engage two chains, wherein the edges of the teeth at the ends of two of the rows are provided with recesses forming datum connection portions, and wherein markings are provided on the crowns of the teeth of the two rows.
Figure 2:
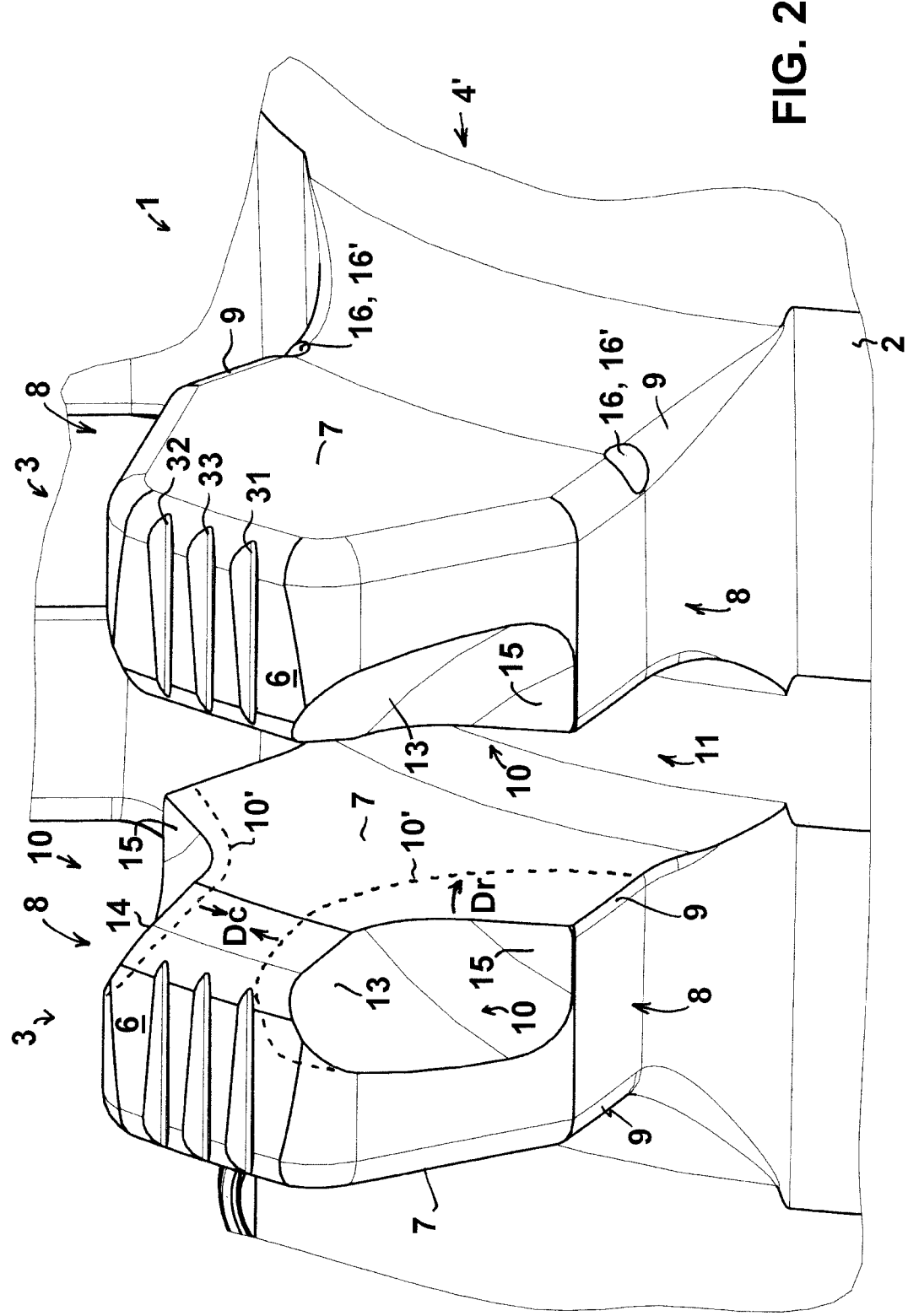
FIG. 2 is an enlarged view of one end of a first row of teeth of the first sprocket showing the recesses.
Figure 3:
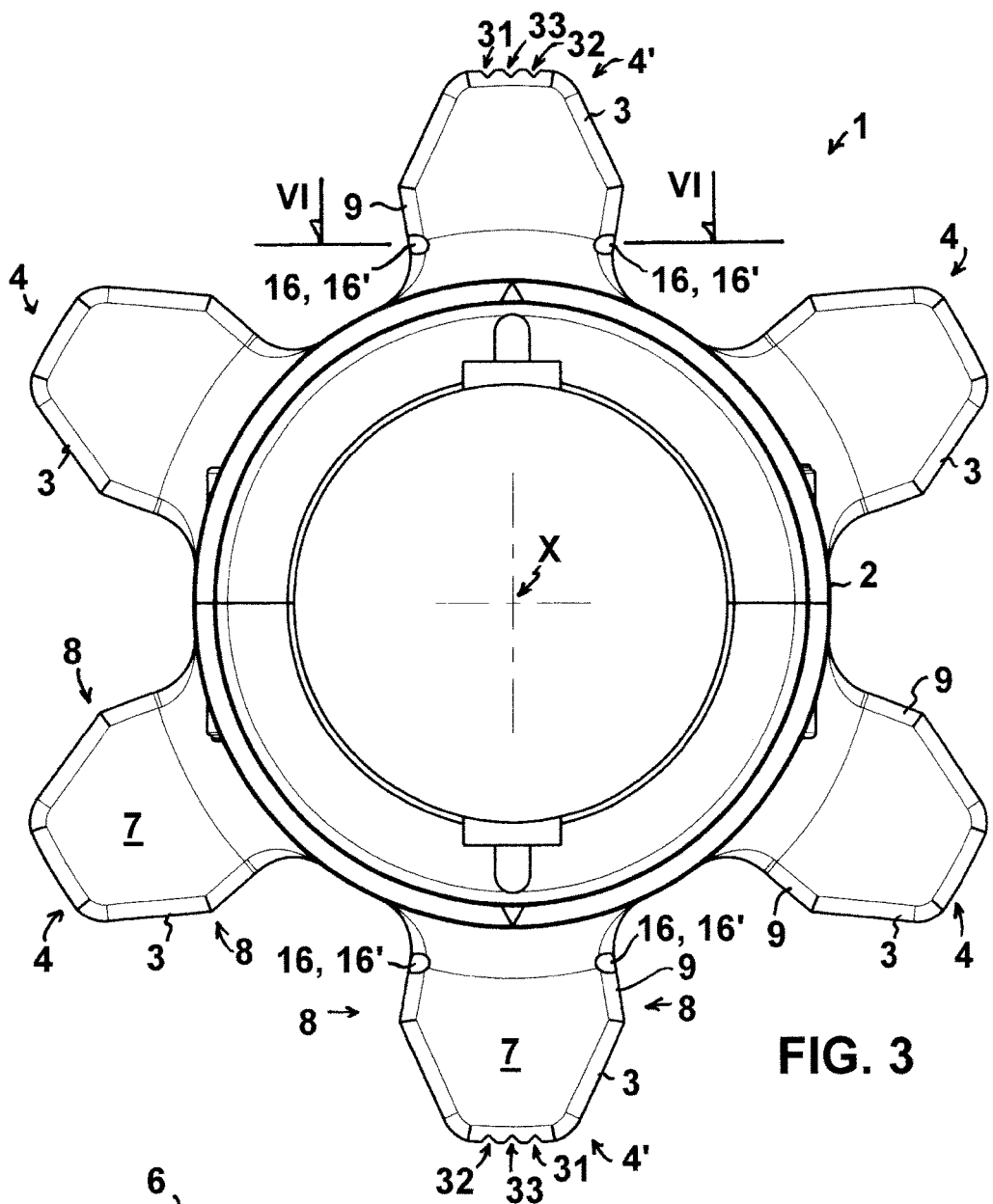
FIG. 3 is an end view of the first sprocket.

Referring to FIGS. 1-3, the first sprocket 1 comprises a body 2 mounted for rotation about an axis X, and a plurality of teeth 3 projecting radially outwardly from the body with respect to the axis X. The teeth 3 are arranged in six rows 4, 4' equally spaced around the axis, and in two sets 5 spaced apart along the axis.

Figure 8:
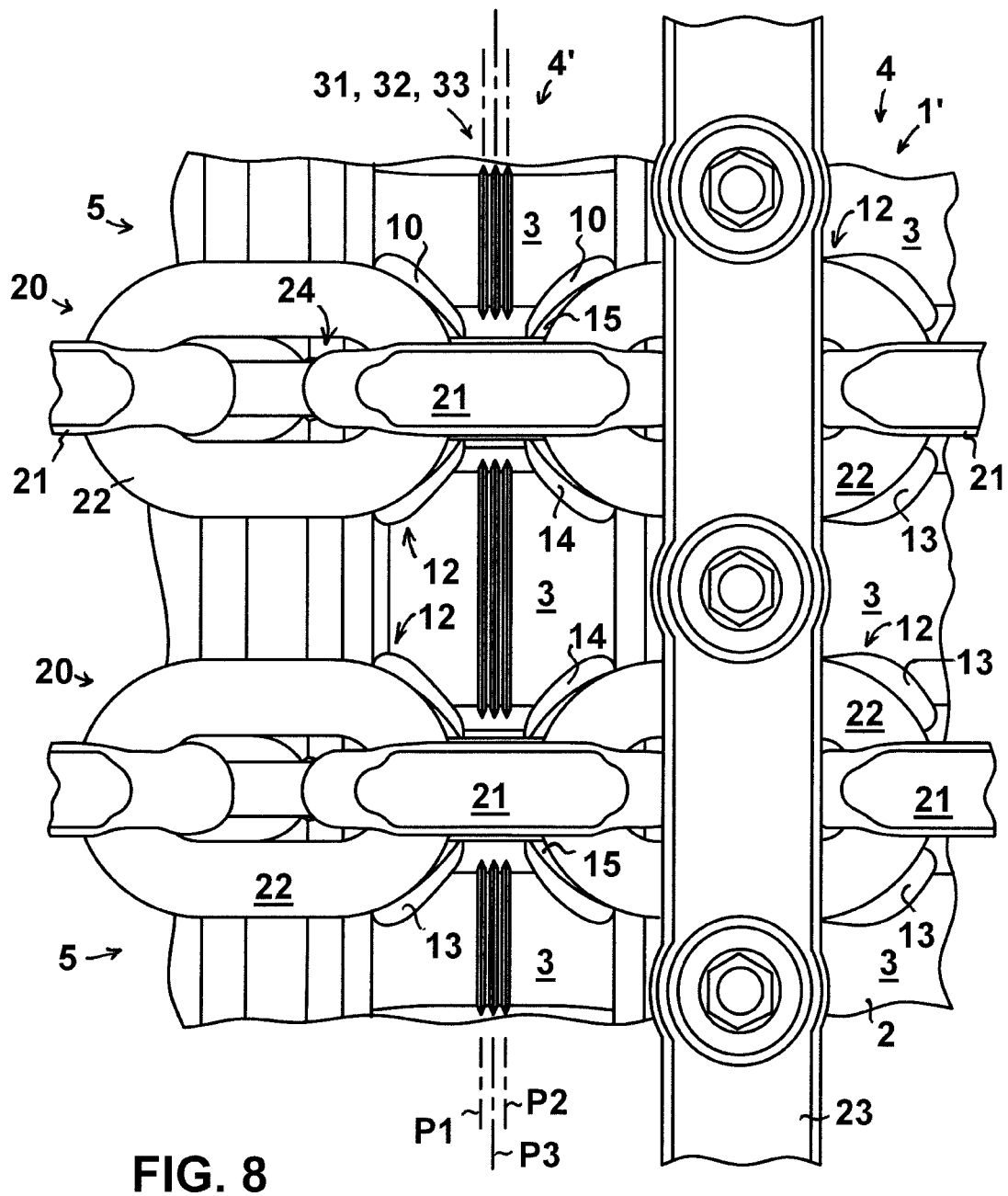
FIG. 8 shows a first row of teeth of a second sprocket, having recesses and markings similar to those of the first row of teeth of the first sprocket, engaged with a pair of chains joined by a flight bar.

Referring also to FIGS. 8 and 9, each set 5 of teeth 3 of the first or second sprocket 1, 1' is configured to engage a respective one of two chains 20 so that the sprocket drives the two chains in motion when the sprocket is mounted on an axle driven by a prime mover, e.g. an electric motor (not shown).

The second sprocket 1' corresponds generally to the first sprocket 1 except that the tooth profile is slightly different, with the centre tooth of each row 4, 4' forming part of both sets 5 of teeth and having two sets of wear surfaces 10 for engaging both of the chains 20. In other respects the description herein applies equally to both sprockets.

In this specification, a chain means an elongate (optionally, endless), flexible body comprising portions, herein termed links, which are connected together in series to transmit a tension force between the links along the length of the chain. A sprocket means a wheel having at least one set of teeth for engaging the links of a chain, for example, to drive the chain in motion.

The links may be rigid rings, which may be made from metal, e.g. steel, wherein each ring extends through respective apertures in two adjacent rings, as in the illustrated embodiments. In such chains, alternate links may be of identical or different configuration, and the sprocket may be arranged as shown to engage only the horizontal links 22 (which is to say, the links lying generally in a plane aligned with the rotational axis of the sprocket), with the vertical links 21 (lying generally in a plane normal to the axis) being accommodated in recesses 11 in the sprocket.

Such chains may be used for example to transmit in excess of 100 tonnes force for use in underground longwall mining operations.

In one such configuration as shown in the illustrated embodiments, the chain or chains may be equipped with bars, referred to as flight bars 23, fixed to respective ones of the links 22 at regular intervals along the length of the chain 20, and extending parallel to each other and normal to the length axis of the or each chain. Away from the sprocket, the bars may be arranged slidingly in a shallow, elongate tray (referred to as a line pan) with the chain or chains 20 extending along the length of the line pan between the bars so that the bars are drawn along the line pan by the motion of the chains, carrying with them coal or other mined material that is removed from the coal face by a cutting machine (e.g. a shearer or plough) and deposited on the line pan. The chains 20 are driven in motion by the sprocket 1, 1' which may be arranged for example in the head drive or tail drive of the conveyor, with the flight bars 23 being accommodated between the rows 4, 4' of teeth of the sprocket 1, 1' as the chain or chains 20 pass around it as shown in FIGS. 8 and 9.

The conveyor may be configured as an armoured face conveyor or longwall face conveyor, including roof supports and a guide rail to support the shearer, so that the mined material falls from the coal face directly onto or adjacent the line pan. Alternatively the conveyor may be configured as a beam stage loader or collecting conveyor which delivers the mined material to another conveyor (e.g. an armoured face conveyor).

In other applications, the sprocket may be used to drive a plough chain to move a plough or other cutting machine along a track, for example, to remove coal from a coal face.

Referring particularly to FIGS. 1-3, each tooth 3 may comprise a radially outward surface or crown 6, side surfaces 7, end surfaces 8, and edges 9, as shown.

The crown 6 faces radially outwardly and extends circumferentially and axially with respect to the axis X.

The side surfaces 7 extend radially and circumferentially and face generally in an axial direction with respect to the axis X.

The end surfaces 8 extend radially and axially and facing generally in a circumferential direction with respect to the axis X.

The edges 9 extend generally radially with respect to the axis X and bound the teeth at intersections of respective ones of the side surfaces and end surfaces.

References herein to extending in a radial, circumferential, or axial direction mean that the respective part or surface has at least some substantial extent in the respective direction, irrespective of whether it also extends in other directions. The terms generally reflect the motion of the chain around the sprocket wherein the active surfaces are mostly curved, and so what matters is the general direction in which the surface faces.

The teeth include wear surfaces 10 which are configured to engage respective links of the respective chain, so that in use the wear surfaces are progressively worn by contact with the chain to define a varying wear profile 10' of the teeth.

The wear surfaces 10 may define pockets 12 which receive the horizontal links 22 of the chain, and may include leading end surfaces 13 and trailing end surfaces 14 as shown which extend radially and axially and face generally in opposite circumferential directions with respect to the axis X. The leading end surfaces 13 forming part of wear surfaces 10 face forwardly while the trailing end surfaces 14 forming part of wear surfaces 10 face backwardly with respect to the direction of rotation of the sprocket. The leading and trailing end surfaces 13, 14 constrain the motion of the chain in its length direction so as to transmit torque from the sprocket to the chain.

The wear surfaces 10 may also include a platform surface 15 which faces generally radially outwardly to form the base of the pocket 12, extending generally in axial and circumferential directions, and which supports the horizontal link 22 of the chain 20 in the radial direction.

It may be noted that in the illustrated configuration the wear surfaces 10 are configured to engage outwardly facing surfaces of the horizontal links 22 of the chain 20, and do not pass through the apertures 24 in the links 21, 22 of the chain. This configuration is suitable for heavy duty applications.

The wear profile 10' as indicated by the broken lines in FIG. 2 indicates the maximally worn state of the wear surface 10 on the forwardly facing side of the tooth, including the leading end surface 13 as well as the respective platform surface 15, as compared with the new condition of the sprocket as illustrated by the solid lines, and thus corresponds to the condition in which the sprocket will require replacement. It can be seen that the wear extends in both the radial direction Dr and the circumferential direction Dc relative to the axis X, and so necessitates an assessment of wear in both radial and circumferential directions, as will now be explained.

In order to assess wear in the radial direction Dr, the sprocket 1, 1' is provided with at least two datum connection portions 16 which are spaced apart axially along the sprocket. The datum connection portions 16 are configured to releasably engage a datum body 17 extending between the datum connection portions 16 to support the datum body 17 in a predefined position relative to the sprocket 1, 1' and proximate a respective one or ones of the wear surfaces 10.

In this specification, a datum body means any body configured to be releasably engaged by the datum connection portions so as to provide a predefined reference position or reference surface from which to determine the position of the wear profile 10' in a given dimension or direction. In the illustrated embodiment, the datum body is configured for monitoring the wear profile 10' in the radial direction Dr.

The datum connection portions 16 form part of the sprocket but do not form part of the wear surfaces 10, and so the predefined position of the datum body 17 is determined by the datum connection portions 16 and is independent of the wear profile, which is to say, it does not change as the teeth wear.

Two pairs of datum connection portions 16 may be provided, the datum connection portions of each pair being spaced apart circumferentially with respect to the axis X, the pairs being spaced apart axially along the sprocket 1, 1'.

It can be seen that the sets 5 of teeth 3 are spaced apart axially along the sprocket 1, 1' between the datum connection portions 16.

As shown, the datum connection portions 16 may be arranged radially inwardly of the wear surfaces 10 with respect to the axis X.

Further as shown, each of the datum connection portions 16 may be configured as a recess 16' in a respective one of the edges 9 of respective tooth 3. Thus, each of the two teeth 3 at opposite ends of a row 4, 4' may comprise two recesses 16' formed respectively in its two axially outwardly facing edges 9.

In the illustrated embodiment, each of the two first rows 4' of the first sprocket 1 comprises four recesses 16 arranged at the axially outwardly facing edges 9 of the two teeth 3 at opposite ends of the respective row 4'. Since all the rows wear at a similar rate, this enables wear to be determined by observing a single one of the rows, as will now be described.

In order to determine or monitor the wear of the sprocket, a datum body 17 is releasably engaged with the datum connection portions 16 to extend axially along the sprocket 1, 1' between the datum connection portions.

The datum body 17 is supported by the datum connection portions 16 in a predefined position relative to the sprocket 1, 1' and proximate a respective one or ones of the wear surfaces 10.

Figure 5:
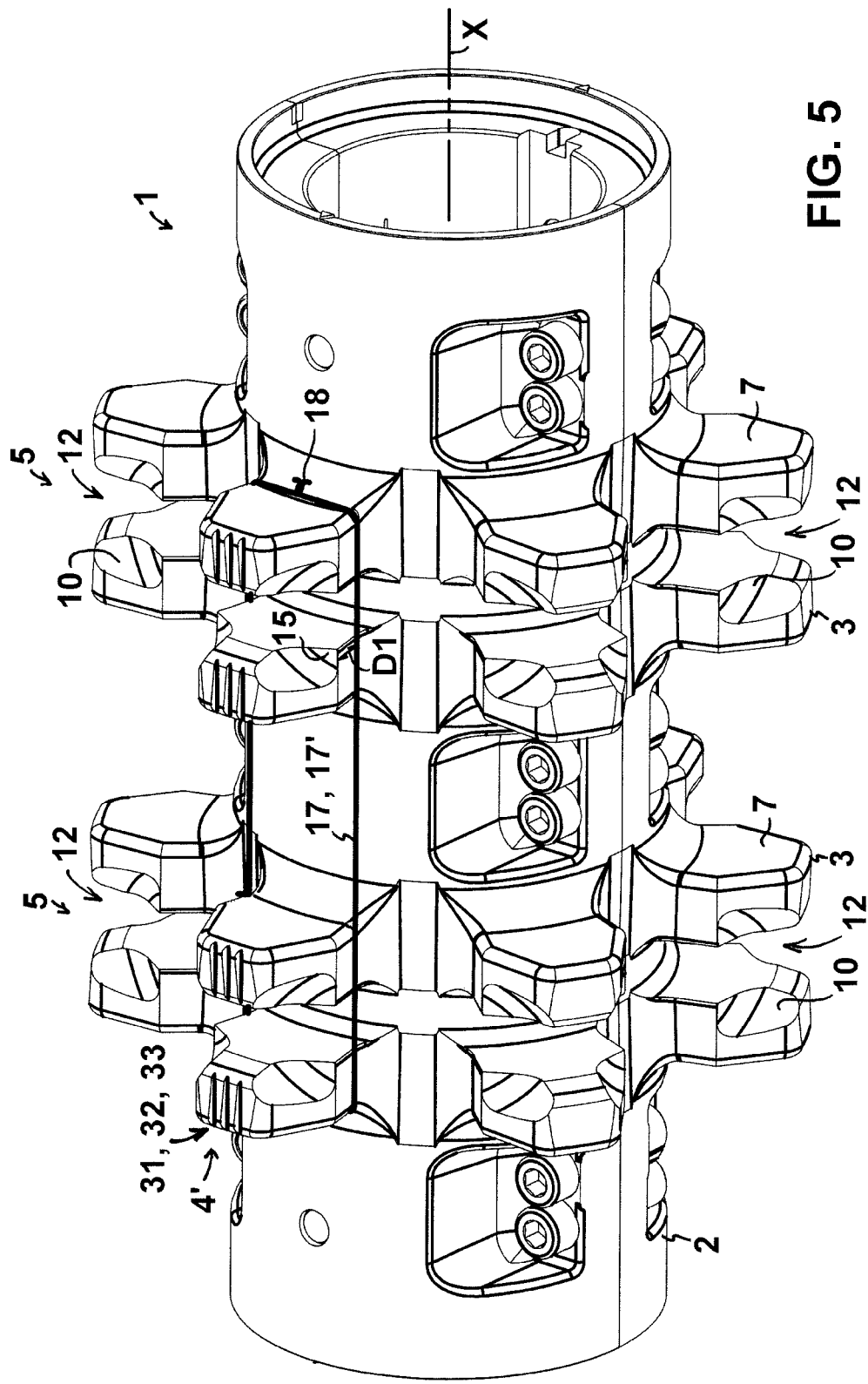
FIG. 5 shows the first sprocket with a datum body comprising a tensioned wire engaged in the recesses.

Referring to FIGS. 5 and 9, the datum body 17 may comprise or consist of a wire 17', which is arranged as shown in tension between the recesses 16' forming the datum connection portions 16. The wire 17' can be a common metal wire which is cut to a suitable length and wrapped around the respective row 4' of teeth 3 and then tensioned by twisting together its free ends 18.

As shown in FIG. 9, the wire 17' may be inserted through the gap between the chains 20 and the generally cylindrical body 2 of the sprocket 1, 1' and tensioned to a straight line as shown in FIG. 5 without passing through any of the links 21, 22 of the chains or though any of the teeth 3 in-between the axially spaced recesses 16'. Thus, the tensioned wire forms a reliable reference surface.

The degree of wear may then be monitored or measured by determining the distance D1 between the respective wear surface or surfaces 10 (for example, the platform surface 15) and the datum body 17. This may be done approximately by eye or by means of a ruler or other suitable measuring instrument (not shown). Once the assessment is done the datum body 17 is disengaged from the datum connection portions 16, for example, by cutting and removing the wire 17'.

Figure 6:
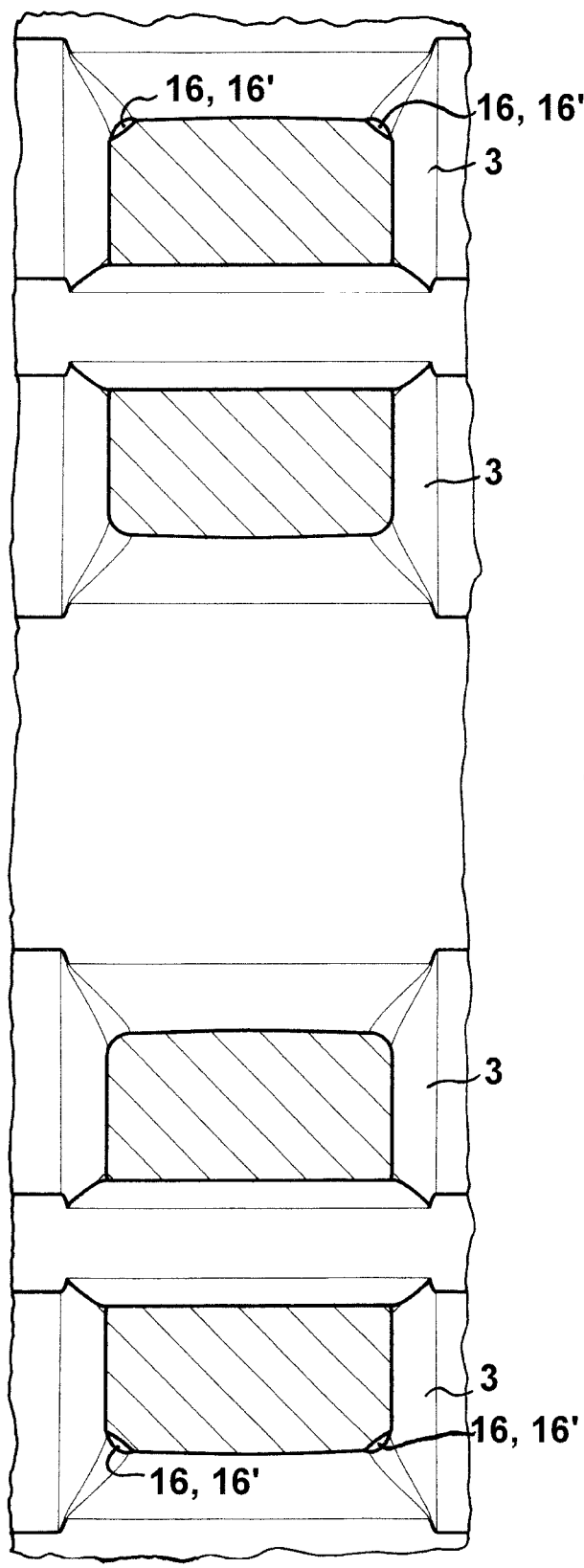
FIG. 6 is a section through the recesses at VI-VI of FIG. 3.
Figure 7:
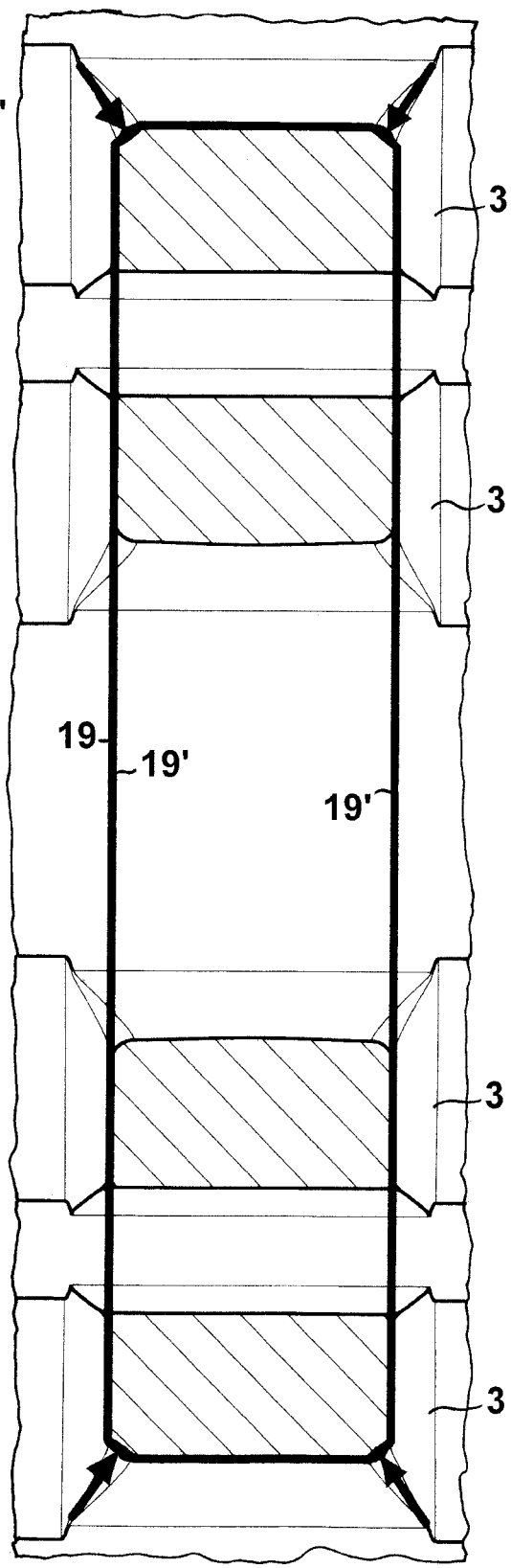
FIG. 7 shows the section of FIG. 6 with a line illustrating an imaginary closed figure drawn at the position of the tensioned wire.

Referring to FIGS. 6 and 7, the recesses 16' may be formed to a depth of a few millimetres, for example, about 1.5 mm to about 3.5 mm, to receive a wire 17' of relatively small diameter, for example, less than about 3 mm, less than about 2 mm, or less than about 1.5 mm diameter.

In the illustrated configuration, the recesses 16' define four corners of an imaginary closed FIG. 19 as shown in FIG. 7, each recess extending into the respective edge 9 of the respective tooth 3 in a direction inwardly into the closed FIG. 19 as indicated by the arrows in FIG. 7.

The closed figure as shown in FIG. 7 is formed by a line 19' corresponding to the position of the wire 17', from which it can be seen that a straight line 19' extending axially along the sprocket 1, 1' and tangent to a surface of each of the recesses 16' does not pass through any of the teeth 3 between the recesses 16'.

Figure 4:
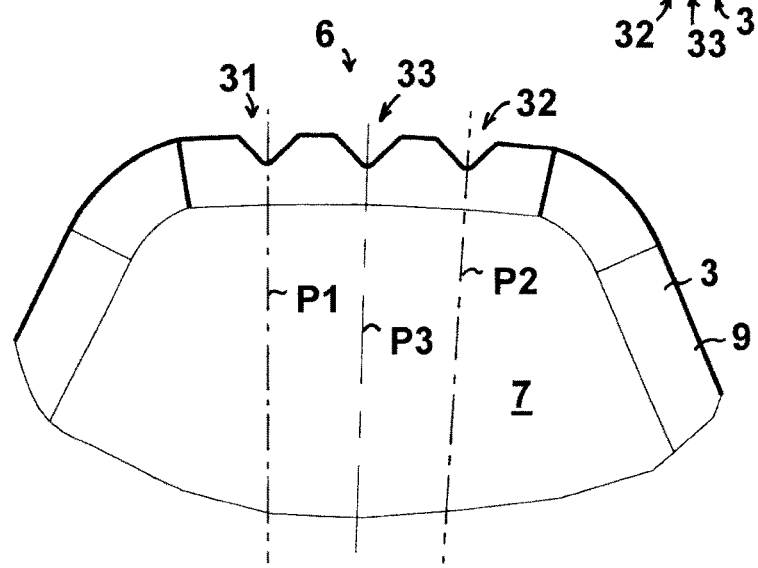
FIG. 4 is an enlarged view of the crown of one of the teeth at the end of the first row as shown in FIG. 3.

Referring also to FIGS. 4 and 10, in order to assess wear in the circumferential direction Dc around the axis X, at least one of the teeth 3 may be provided with at least first and second markings 31, 32, the markings 31, 32 being provided on a visible surface of the respective tooth which does not form part of the wear surfaces 10, 13, 14, 15.

The first and second markings 31, 32 are spaced apart angularly about the axis X and are arranged in respective, first and second reference planes P1, P2 which extend radially and axially with respect to the axis X between the respective, leading and trailing end surfaces 13, 14 of the respective tooth 3 in an unworn condition of the sprocket 1, 1' (as indicated by the solid lines in the figures). The first and second reference planes P1, P2 indicate maximum wear limits for the leading and trailing end surfaces 13, 14.

Preferably the first and second markings 31, 32 are equally angularly spaced about the axis X on opposite sides of a third, central reference plane P3 extending radially and axially with respect to the axis X and centrally between the leading and trailing end surfaces 13, 14 of the respective tooth 3 in an unworn condition of the sprocket 1, 1'.

A third marking 33 may be arranged on the visible surface 6 of the tooth in the central reference plane P3.

The markings may be provided on the same ones of the teeth as the datum connection portions 16.

Alternatively or additionally, as shown, the markings may be provided on all of the teeth in one or more of the rows 4, 4' of teeth.

Conveniently as illustrated, the markings may be provided on all of the teeth in the same row or rows 4' as the datum connection portions 16.

Preferably as shown the markings 31, 32, 33 are provided on the crown or radially outward surface 6 of the tooth 3

This makes it easy to observe the markings and by reference to the markings to project and determine the position of the wear surfaces 10 specifically, the leading and trailing end surfaces 13, 14 relative to the first, second and third reference planes, optionally with the chains 20 in place and using the surface of the horizontal chain link 22 as a convenient working surface as shown in FIG. 10.

In a worn condition of the sprocket as indicated by the wear profile 10' of FIG. 2, the distance D2 between either or both of the leading and trailing end surfaces 13, 14 and a respective one or both of the reference planes P1, P2 can be determined by reference to the markings 31, 32, 33.

In particular, the markings 31, 32, 33 make it possible to evaluate the degree of wear of each of the leading and trailing end surfaces 13, 14 in the circumferential direction Dc independently of the other and relative to the reference planes P1, P2 and, hence, to the central reference plane P3.

In summary, a sprocket comprising teeth for engaging one or more chains is provided with datum connection portions which releasably support a datum body, such as a tensioned wire, in a predefined position. The datum body provides a temporary reference or datum element or surface from which the position of the wear surfaces of the sprocket teeth may be determined by eye or by measurement, particularly in the radial direction. The teeth may further comprise a set of markings corresponding to angularly spaced reference planes intersecting at the sprocket axis. The markings are preferably arranged on the crown or radially outward surface of the teeth and are used to determine wear in the circumferential direction.

In alternative embodiments the novel sprocket may comprise any required number of teeth, sets of teeth and rows of teeth to engage one, two or more chains.

Any or all of the rows of teeth may comprise datum connection portions and/or markings to facilitate monitoring of the respective wear surfaces.

The novel sprocket may drive the chain or chains of a conveyor for conveying mined material in an underground mine, or may drive a chain or chains to urge a cutting machine along a working face in an underground mine.

In alternative embodiments, the chain may comprise, for example, an endless track supporting a track laying vehicle, e.g. an excavator or a tank, which is driven in motion by the sprocket.

In alternative embodiments, the datum body could be rigid or flexible and could be any convenient shape. For example, the datum body may comprise or consist of a wire or cord or other flexible element configured to act in tension, or alternatively a rigid element such as a bar. The datum connection portions may extend outwardly from or inwardly into a surface of the body or teeth of the sprocket to releasably engage the datum body and support it in its predefined position.

Many further adaptations are possible within the scope of the claims.

INDUSTRIAL APPLICABILITY

The markings as well as the datum connection portions may be configured as recesses in the unworn parts of the sprocket, so that the novel arrangement can be readily applied in the field to part worn sprockets as a rework procedure (e.g. by simply filing or grinding out the recesses 16' and markings) when repairing the chain drive system, as well as to new sprockets during manufacture. On a part worn sprocket, the markings can be positioned by reference to the unworn parts of the sprocket, for example, by means of a jig.

The novel arrangement may be used for easier and more reliable evaluation of wear in both the radial and circumferential directions on sprockets with one, two or more sets of teeth for engaging one, two or more chains, and may be used by relatively inexperienced personnel without special tools and with the chains either on or off the sprocket.

For evaluating wear with the chains in place, the datum body may be passed through the gap between the horizontal chain links and the body of the sprocket, providing a new datum surface for all of the sets of teeth on the sprocket and so obviating the need to find multiple reference points or to clean the sprocket surface other than in the small and relatively easily accessible regions of the datum connection portions.

In the claims, reference numerals or characters in parentheses are provided purely for ease of reference and should not be construed as limiting features.

The invention claimed is:

1. A sprocket for use with at least one chain and including:
   a body mounted for rotation about an axis, and
   a plurality of teeth projecting radially outwardly from the body with respect to the axis;
   the teeth including wear surfaces configured to engage respective links of the at least one chain, wherein in use the wear surfaces are progressively worn by contact with the chain to define a varying wear profile of the teeth;
   wherein the sprocket further includes at least two datum connection portions spaced apart axially along the sprocket and not forming part of the wear surfaces,
   the datum connection portions being configured to releasably engage a datum body extending between the datum connection portions to support the datum body in a predefined position relative to the sprocket and proximate a respective one or ones of the wear surfaces, said predefined position being independent of the wear profile.

2. A sprocket according to claim 1, wherein the teeth include:
   side surfaces extending radially and circumferentially and facing generally in an axial direction with respect to the axis,
   end surfaces extending radially and axially and facing generally in a circumferential direction with respect to the axis, and
   edges bounding the teeth at intersections of respective ones of the side surfaces and end surfaces;
   and each of the datum connection portions is configured as a recess in a respective one of the edges.

3. A sprocket according to claim 2, wherein a straight line extending axially along the sprocket and tangent to a surface of each of the recesses does not pass through any of the teeth between the recesses.

4. A sprocket according to claim 2, wherein two pairs of said recesses are provided, the recesses of each pair being spaced apart circumferentially with respect to the axis, the pairs being spaced apart axially along the sprocket such that the recesses define four corners of an imaginary closed figure;
   and each recess extends into the respective edge in a direction inwardly into the closed figure.

5. A sprocket according to claim 1, wherein the sprocket includes at least two sets of teeth, the sets of teeth being spaced apart axially along the sprocket between the datum connection portions to engage at least two chains.

6. A sprocket according to claim 1, wherein the datum connection portions are arranged radially inwardly of the wear surfaces with respect to the axis.

7. A sprocket according to claim 1, wherein at least one of the teeth is provided with at least first and second markings, the first and second markings being provided on a visible surface of the respective tooth, the visible surface not forming part of the wear surfaces;
   the first and second markings being arranged in respective, first and second reference planes extending radially and axially with respect to the axis and spaced apart angularly about the axis between the respective, leading and trailing end surfaces of the respective tooth in an unworn condition of the sprocket;
   the leading and trailing end surfaces forming part of the wear surfaces and extending radially and axially and facing generally in opposite circumferential directions with respect to the axis;
   said first and second reference planes indicating maximum wear limits for the leading and trailing end surfaces.

8. A method for monitoring wear in a sprocket for use with at least one chain, the sprocket including:
   a body mounted for rotation about an axis, and
   a plurality of teeth projecting radially outwardly from the body with respect to the axis;
   the teeth including wear surfaces configured to engage respective links of the at least one chain, wherein in use the wear surfaces are progressively worn by contact with the chain to define a varying wear profile of the teeth;
   the method comprising:
     arranging at least two datum connection portions spaced apart axially along the sprocket, the datum connection portions forming part of the sprocket but not part of the wear surfaces;
     releasably engaging a datum body with the datum connection portions to extend axially along the sprocket between the datum connection portions, wherein the datum body is supported by the datum connection portions in a predefined position relative to the sprocket and proximate a respective one or ones of the wear surfaces, said predefined position being independent of the wear profile; and then
     determining a distance between the wear surfaces and the datum body; and then
     disengaging the datum body from the datum connection portions.

9. A method according to claim 8, wherein the datum body comprises a wire, and the wire is arranged in tension between the datum connection portions.

10. A method according to claim 8, further including:
    providing at least one of the teeth with at least first and second markings, the first and second markings being provided on a visible surface of the respective tooth, the visible surface not forming part of the wear surfaces;
    the first and second markings being arranged in respective, first and second reference planes extending radially and axially with respect to the axis and spaced apart angularly about the axis between the respective, leading and trailing end surfaces of the respective tooth in an unworn condition of the sprocket;
    the leading and trailing end surfaces forming part of the wear surfaces and extending radially and axially and facing generally in opposite circumferential directions with respect to the axis;
    said first and second reference planes indicating maximum wear limits for the leading and trailing end surfaces;
    and then, in a worn condition of the sprocket, determining a distance between at least one of the leading and trailing end surfaces and at least one of the first and second reference planes by reference to at least one of the markings.

* * * * *